United States Patent [19]
Gimaret

[11] 3,970,736
[45] July 20, 1976

[54] METHOD OF MANUFACTURING HOLLOW ELEMENTS FROM THERMOPLASTIC MATERIALS

[75] Inventor: Pierre Louis Gimaret, Cailloux-sur-Fontaine, France

[73] Assignee: Etablissements Metallurgiques du Val d'Ambv, Lyon, France

[22] Filed: Jan. 29, 1975

[21] Appl. No.: 545,090

Related U.S. Application Data

[63] Continuation of Ser. No. 123,237, March 11, 1971, abandoned.

[52] U.S. Cl. ............................ 264/310; 264/114; 264/126; 264/331; 264/DIG. 46
[51] Int. Cl.² ..................... B29C 5/04; B29F 5/00
[58] Field of Search .... 264/126, 310, 311, DIG. 46, 264/114, 348, 331, 109

[56] References Cited
UNITED STATES PATENTS

| | | |
|---|---|---|
| 2,736,925 | 3/1956 | Heisler et al. ........................ 264/126 |
| 3,172,160 | 3/1965 | Woodhouse ......................... 264/310 |
| 3,217,078 | 11/1965 | Kleiber ................................ 264/310 |
| 3,315,314 | 4/1967 | Barnette et al. ................ 425/435 X |
| 3,316,339 | 4/1967 | Breneman .......................... 264/310 |
| 3,329,751 | 7/1967 | Slicker et al. ......................... 264/85 |

*Primary Examiner*—Willard E. Hoag
*Attorney, Agent, or Firm*—Donald D. Jeffery

[57] ABSTRACT

A method of moulding a drum or similar from a thermoplastic resin in powdered form, in which an appropriately shaped mould, after introduction of the thermoplastic material, is subjected to the actions of alternate direction rotation, tilting, heating and cooling in a predetermined sequence with the heating of the drum body and ends being effected and controlled independently.

5 Claims, 5 Drawing Figures

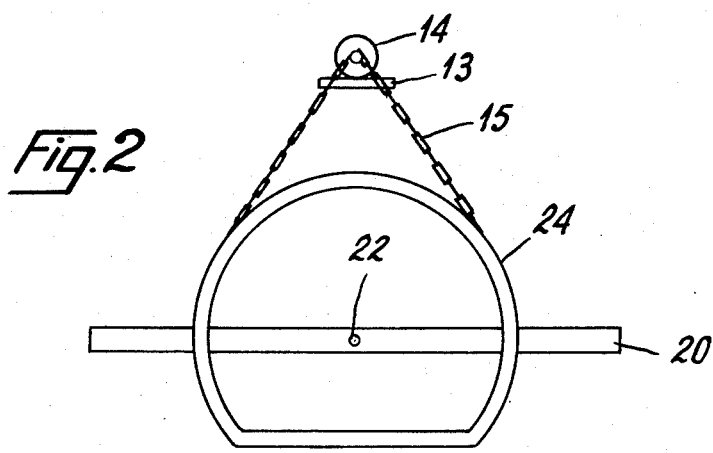
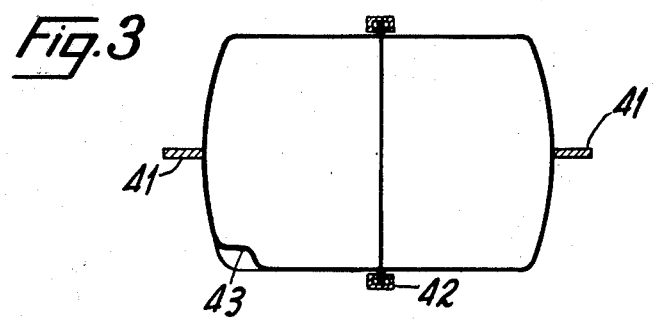
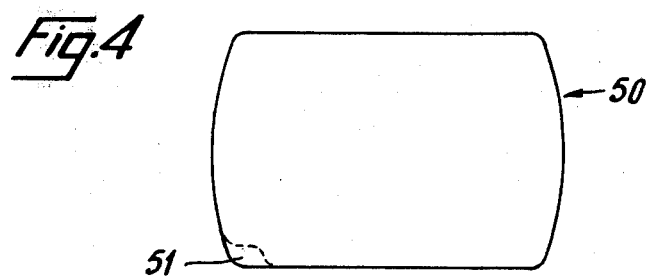
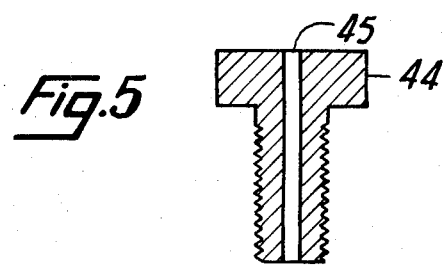

METHOD OF MANUFACTURING HOLLOW ELEMENTS FROM THERMOPLASTIC MATERIALS

This is a continuation of application Ser. No. 123,237, filed Mar. 11, 1971, and now abandoned.

This invention relates to a method of manufacturing hollow elements of large dimensions from thermoplastic materials, such for example as high capacity storage tanks and vats.

It is not possible to produce hollow elements of thermoplastic materials, of large dimensions, without welding, the usual method consisting of forming and welding sheets of thermoplastic material together. The known method of moulding by double rotation does not make it possible to manufacture parts of large dimensions and uniform thickness.

It is an object of the present invention to facilitate the manufacture without welding of substantially cylindrical hollow elements of large dimensions comprising a body and a bottom. In particular, it uses a novel method for the manufacture of hollow elements from thermoplastic powders, especially powders of polyolefines or polyamides.

More precisely the present invention involves the use of a cylindrical or substantially cylindrical mould, with a central, longitudinal axis of symmetry. The invention proposes a particular moulding technique which uses a particular combination of heating, rotations around the central longitudinal axis and tilting about a central transverse axis.

Characteristically, the present invention provides for the moulding of a thermoplastic powder material comprising the steps of introducing particulate thermoplastic material into a cylindrical mould, a first stage of heating during which a rotational movement about a central horizontal, longitudinal axis of the mould is imparted to the mould and at the same time the body and the ends of the mould are heated, a second stage of moulding the ends during which an alternating rotational movement is imparted to the mould about the said axis of rotation, such alternating rotational movement comprising a rotation of n revolutions plus a fraction of a revolution in one direction, alternated with a rotation of n revolutions less the same fraction of a revolution in the other direction, the axis of rotation, at each reversal of the direction of rotation being subjected to a tilting about an axis substantially perpendicular to the axis of rotation, inclining it firstly to one side, then to the other and the heating taking place on the body and the ends of the mould, a third stage of progressive cooling of the ends in which the method of the second stage is continued by reducing the heating of the bottoms, a fourth stage of moulding the body in which the same alternating rotational movement as in the second stage is imparted to the mould, but where the axis of rotation remains substantially horizontal, only the heating of the body being maintained, a fifth stage of cooling of the body in which the method of the fourth stage is continued by stopping the heating of the body, and a sixth stage of removing the mould.

There may also be provided between the two first stages, an intermediate stage, similar to the second stage, in which the alternating rotations last for a lesser number of revolutions than the number corresponding to the second stage.

The alternating rotations make it possible to fill equally over both sides the unevennesses of the mould provided for the positioning of various parts, for example bosses or the beginnings of flanged valves or other parts.

The tilting makes it possible to fill the bottoms equally; their depth depends above all on the duration of the third stage. Once the bottoms are formed and slightly cooled, the rest of the filler serves for moulding the body. After the end of the third stage, one may advantageously correct the axis of rotation not directly to the horizontal but by exceeding it a little before returning to the horizontal so as to spread the part of the filler remaining fluid better along the body.

In order to allow the mould to breathe, it is possible, in an advantageous manner to provide at least one air-hole which preferably only opens after the beginning of the melting of the powder in order to avoid losses. This air-hole may advantageously be a simple aperture stopped up by material of the same chemical nature as the moulding material, but with a lower melting point. There can also be used a system of shutters or automatic valves for allowing this breathing (removal of the air during heating, return of the air on cooling).

Materials particularly suited to the method according to the invention are polyolefines and polyamides in powdered form. Polyethylene, polypropylene, olefinic copolymers and Rilsan are used.

An embodiment of the present invention will now be described, by way of example, with reference to the accompanying drawings, in which:

FIG. 2 shows diagrammatically how the tilting of the movable assembly is effected;

FIG. 3 shows a mould in section;

FIG. 4 shows a vat made with the mould of FIG. 3; and,

FIG. 5 shows an embodiment of an air-hole in the mould.

Figure 1:
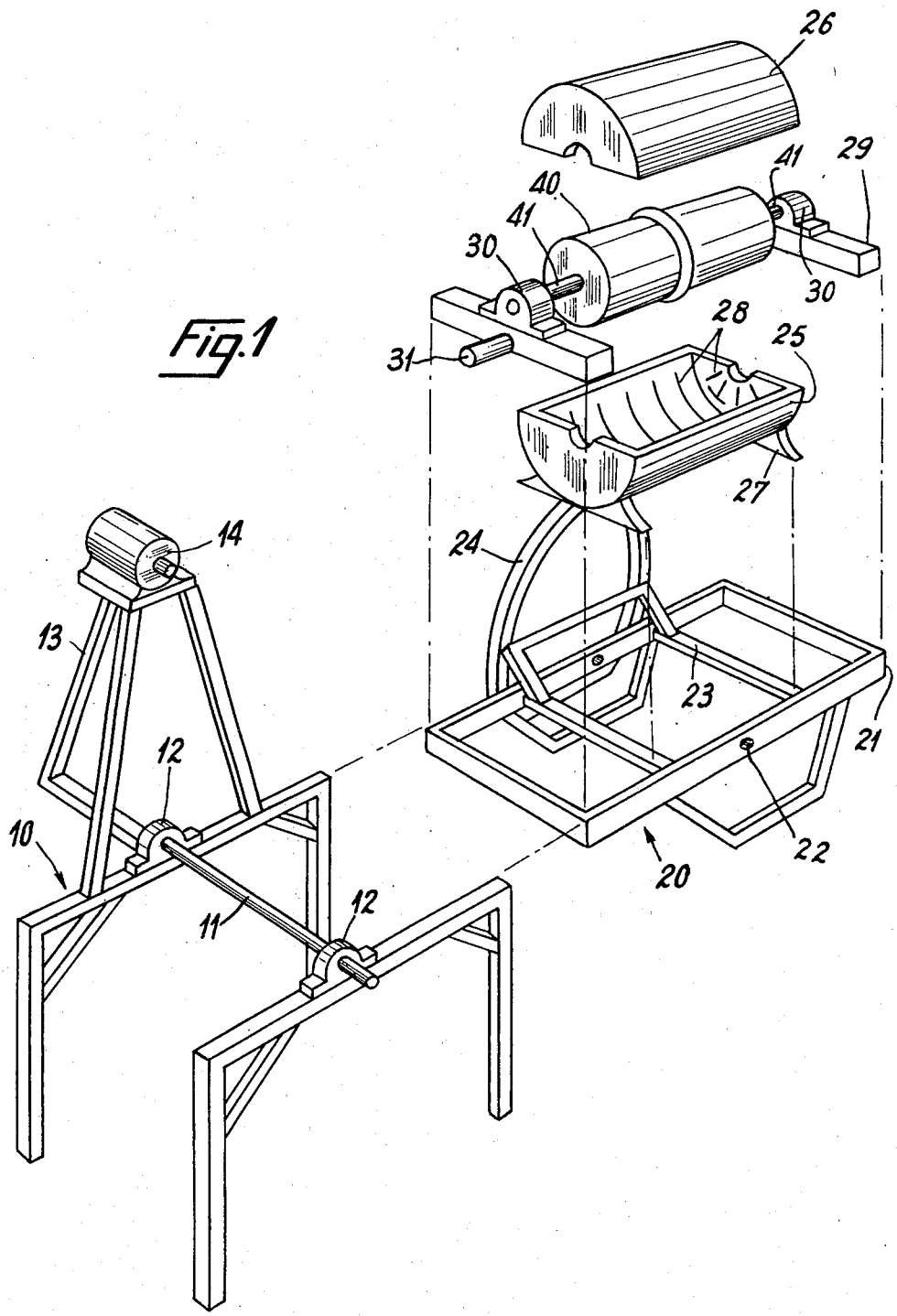
FIG. 1 is an exploded view of a machine using the method of mould according to the present invention, this machine is only given as a preferred example of those which use the method of the invention.

FIG. 1 shows an embodiment of a machine which makes use of the invention. It comprises a frame 10 to which are attached, on the one hand, two bearings 12 mounting a tilting shaft 11 and, on the other hand, a support 13 for a tilting motor 14.

The movable assembly 20, which can pivot through + or − 45° about the shaft 11 which passes through holes 22 in the frame 21 of the assembly. This frame 21 supports a rail 24 closed in the shape of an arc of a circle with its centre aligned on the holes 22. This rail 24 has a U-shaped section which ensures the guidance of a chain 15 (FIG. 2) which transmits to the frame the tilting motion imposed by the motor 14.

The frame 21 supports an insulating heating enclosure 25, 26. The lower part 25 is permanently fixed to the frame 21 by brackets 27 and includes resistances 28 for heating the mould, which resistances heat independently the semi-cylindrical part on the one hand, and the ends on the other hand. The upper part 26 is movable and may be attached to the part 25.

The frame 21 comprises at its ends supports 29 for bearings 30 in which the shaft 41 of the mould 40 rotates. One of the supports 29 contains the motor 31 for the rotational drive and the transmission between this motor and the shaft 41.

The mould 40 is constituted by two half moulds connected at 42 by coupled flanges; it comprises a threaded hole in which is fixed a bolt 44 pierced from end to end by a cylindrical hole 45 (FIG. 5).

There will now be described in detail the manufacture of a 3000 liter vat using the method according to the invention and the abovedescribed machine.

150 kg of polyethylene are weighed (of quality No. 2430 H of the Badische Anilin and Soda Fabrik Company, of grade 1.7) and are crushed by mechanical means so as to have a screen analysis comprised between 25 and 340 microns. This amount of polyethylene is introduced into the mould 40 which is positioned in the machine described. Due to the tilting means 14, 15 and 24, the shaft 41 is kept substantially horizontal and the mould is rotated in a first direction at a speed of 2 revolutions per minute, for 9 minutes. During this time the electric heating of the body and the ends is started.

At the end of 9 minutes the movable assembly is tilted to one side and the mould is rotated for 3¼ revolutions in the same direction, and for 2¾ revolutions in the other direction. The enclosure 24, 25 is then tilted and the second stage is begun by rotating the mould 6¼ revolutions in the first direction; the movable assembly is tilted again and the mould is rotated by 5¾ revolutions in said other direction. It is again tilted and these alternating rotational motions and tilting motions are continued until the 75th minute. At the 40th minute, the material is suitably spread over the ends; the heating of the ends is reduced so that they cool progressively and at the 68th minute, the heating of the ends is finally stopped.

At the 75th minute, the ends are sufficiently solidified for effecting the moulding of the body, the heating of which is increased. The shaft 41 of the mould is returned to the horizontal, after having tilted slightly to the other side, in order to bring the fluid material to the centre of the mould. The single movement of alternating rotation is continued: 6¼ revolutions in the first direction and 5¾ revolutions in the other direction.

At the 93rd minute, the remainder of the fluent material is well distributed over the body of the mould; the heating is stopped to allow the cooling of the body.

At the 100th minute, the upper part 26 of the insulating enclosure is removed.

In order to allow for the breathing of the mould, i.e. in order to avoid too great a pressure inside the mould during heating and the breakage of the moulded part on cooling, suitable means are provided. Thus, the mould 40 is provided with a bolt 44 pierced by a hole 45 stopped up with some grade 70 polyethylene. The latter melts at a much lower temperature than the powder to be moulded and clears the opening 45 at about the 20th minute, that is at a moment when the powder has begun to agglomerate and no longer tends to escape through the hole. Similarly, during cooling, at least two openings are provided in the part for the inlet of air when the temperature reaches 65° to 70°C.

The degree of heating is controlled such that the temperature of the material during the stages of distribution of the latter on the walls of the mould reaches the melting point of the material at about 300°C, the removal of the mould takes place without difficulty since a cooling of the flanges is provided, by the bottom of the lower part of the insulated enclosure 25, which prevents the formation of a joint in the region of the connection between the half-moulds. A vat 50 of 3000 liters capacity is obtained, comprising the shapes 51 provided at 43 in the mould 40, of 150kg weight and with a wall thickness of 12mm.

To produce a vat of the same shape, but having a wall thickness of 14mm for a weight of 175 kg, one carries out a similar method only differing in the length of the stage of moulding the ends which lasts 10 minutes longer, from the 9th to the 50th minute, the sequence of operations being altered by 10 minutes.

For using the method with other materials than polyethylene of grade 1.7, it is appropriate to adapt the heating temperatures, the speeds of rotations and the duration of various operations.

The preceding description has shown effectively the main differences between the method according to the invention and the method of moulding by double rotation. These main differences are, on the one hand, that the tilting movement of the invention separates the material in order preferentially to spread it on the ends, whereas the object of the double rotation is to spread the material uniformly and, on the other hand, with the present invention the heating cycles of the ends, and of the body are independent and very different, whereas in the double rotation method, the heating cycle is the same for the entire part.

The method of the invention has proved superior to the methods of prior art:
  it facilitates production of vats or tanks having external projections made by moulding or incorporating parts embedded in the moulded material;
  colouring agents may be added to the thermoplastic powder so that the vat finally obtained has a uniform colour;
  analysis shows a very remarkable homogeneousness of material, very good uniformity of thickness of the walls with a visible surface having a very smooth "skin".

It should also be noted that the use of heating elements separate from the mould makes it possible to modify very easily the length of the mould by incorporating in it additional annular wall elements.

What is claimed is:

1. A method for the manufacture by moulding with thermoplastic resins in powdered form of hollow elements of substantially cylindrical shape comprising a cylindrical body and two ends and having an internal volume of at least one thousand liters, and the method comprising the steps of introducing a particulate thermoplastic resin material into a cylindrical mould, said thermoplastic resin being selected from the group consisting of polyethylene, polypropylene, thermoplastic polyolefin copolymers and a self-condensate of 11-aminoundecanoic acid, a first stage of heating during which a rotational movement about a central longitudinal axis of said cylindrical mould is imparted to the mould while at the same time heating both the body and the ends of the mould, said longitudinal axis being maintained horizontal; a second stage of moulding the ends during which rotational movement in alternate directions in sequence is imparted to the mould about said axis of rotation while simultaneously heating said body and ends of said mould, said second stage further including the step of alternately tilting said mould in opposite directions about a central axis transverse to said axis of rotation at predetermined intervals, said longitudinal and transverse axis both passing through the gravity center point of the mold; which intervals at least exceed the time required for several revolutions of said mould, with said mould being retained in tilted position during each entire interval, while said alternate rotation about said axis of rotation continues, the mould thereby being tilted and thus inclined first to one side, then to the other, while heating both said body and ends of the mould; a third stage of progressively cooling the ends of the mould by first reducing and then completely terminating the heating of the ends of the mould, with the alternating tilting and rotation of the mould continuing as in said second stage; a fourth stage of moulding the body in which the same alternating rotational movement as in the second stage is imparted to the mould, but where the axis of rotation remains substantially horizontal and heat is applied only to said body of the mould; a fifth stage of cooling the body in which the method of the fourth stage is continued and the heating of the body is terminated, and a sixth stage of removing the mould, said heating being sufficient to melt said powder at least partially and to cause said powder to agglomerate.

2. A method according to claim 1, in which there is effected between the first and the second stages, an intermediate stage during which the rotations of the mould are alternated more frequently than in the second stage, and in which the mould is only tilted after a rotation of the mould in both directions.

3. A method according to claim 1, in which there is communication between the inside and the outside of the mould during the second stage.

4. The method of claim 1 wherein said alternating rotational movement of said mould in said second stage comprises a rotation of n revolutions plus a fraction of a revolution in one direction, alternated with a rotation of n revolutions less a fraction of a revolution in the other direction, with said alternate rotations occurring while said mould is in each tilted position, and wherein said heating is effected by electric resistance elements embedded in said body ends of said mould and independently actuatable.

5. A method according to claim 1, in which said powder is polyethylene having a grade of 1.7 and a screen analysis comprised between 25 and 340 microns and in which the mould is heated to a temperature of approximately 300°C, rotates at a speed of 2 revolutions per minute, and in which the rotational movement is alternated every 6 revolutions.

* * * * *